(12) United States Patent  
Ito

(10) Patent No.: US 10,090,996 B2  
(45) Date of Patent: Oct. 2, 2018

(54) COMMUNICATION SYSTEM

(71) Applicant: DENSO CORPORATION, Kariya, Aichi-pref. (JP)

(72) Inventor: Akito Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 15/333,375

(22) Filed: Oct. 25, 2016

(65) Prior Publication Data

US 2017/0170951 A1    Jun. 15, 2017

(30) Foreign Application Priority Data

Dec. 15, 2015  (JP) ................. 2015-244537

(51) Int. Cl.
*H04L 7/08* (2006.01)
*H04L 12/40* (2006.01)

(52) U.S. Cl.
CPC .............. *H04L 7/08* (2013.01); *H04L 12/40* (2013.01); *H04L 12/40143* (2013.01); *H04L 12/40182* (2013.01); *H04L 2012/40273* (2013.01)

(58) Field of Classification Search
CPC ..... H04L 7/08; H04L 12/40; H04L 12/40143; H04L 12/40182; H04L 2012/40273
See application file for complete search history.

(56) References Cited

U.S. PATENT DOCUMENTS

| 6,111,888 | A | 8/2000 | Green et al. |
| 2003/0131171 | A1 | 7/2003 | Weigl et al. |
| 2007/0083787 | A1 | 4/2007 | Weigl et al. |
| 2007/0208470 | A1* | 9/2007 | Itabashi ............ H04L 12/4135 701/36 |
| 2011/0015804 | A1* | 1/2011 | Cluff .................. B60R 21/0132 701/1 |
| 2011/0029704 | A1 | 2/2011 | Itou et al. |
| 2011/0066309 | A1* | 3/2011 | Matsuoka ........... B60L 11/1824 701/22 |
| 2011/0320079 | A1* | 12/2011 | Yasuda ..................... G06F 9/52 701/22 |
| 2013/0204484 | A1* | 8/2013 | Ricci ....................... G06F 17/00 701/29.4 |
| 2014/0068126 | A1 | 3/2014 | Itou et al. |
| 2015/0214864 | A1* | 7/2015 | Sopko ...................... H02P 5/52 318/3 |

(Continued)

FOREIGN PATENT DOCUMENTS

JP   2002-332910 A   11/2002
JP   2009-176477 A    8/2009

*Primary Examiner* — Phong La
(74) *Attorney, Agent, or Firm* — Posz Law Group, PLC

(57) ABSTRACT

When a first communication line is abnormal, one of first ECUs as a master node transmits a reference signal to a second communication line. Upon receiving the reference signal, the first ECUs transmit synchronous data items. The reference signal has a higher priority than an asynchronous data item; the synchronous data items each have a higher priority than the asynchronous data item. The first ECUs performs transmissions of entire synchronous data items needed to be transmitted during one transmission cycle of the reference signal at mutual different points of time so that the asynchronous data item is permitted to be transmitted during an interval between the transmissions of the synchronous data items.

10 Claims, 11 Drawing Sheets

(56) References Cited

U.S. PATENT DOCUMENTS

2015/0333686 A1* 11/2015 Nakai .................... H02P 21/22
                                                       318/400.26
2017/0331899 A1* 11/2017 Binder ................... H04L 67/12
2018/0034912 A1*  2/2018 Binder ................... H04L 67/12

* cited by examiner

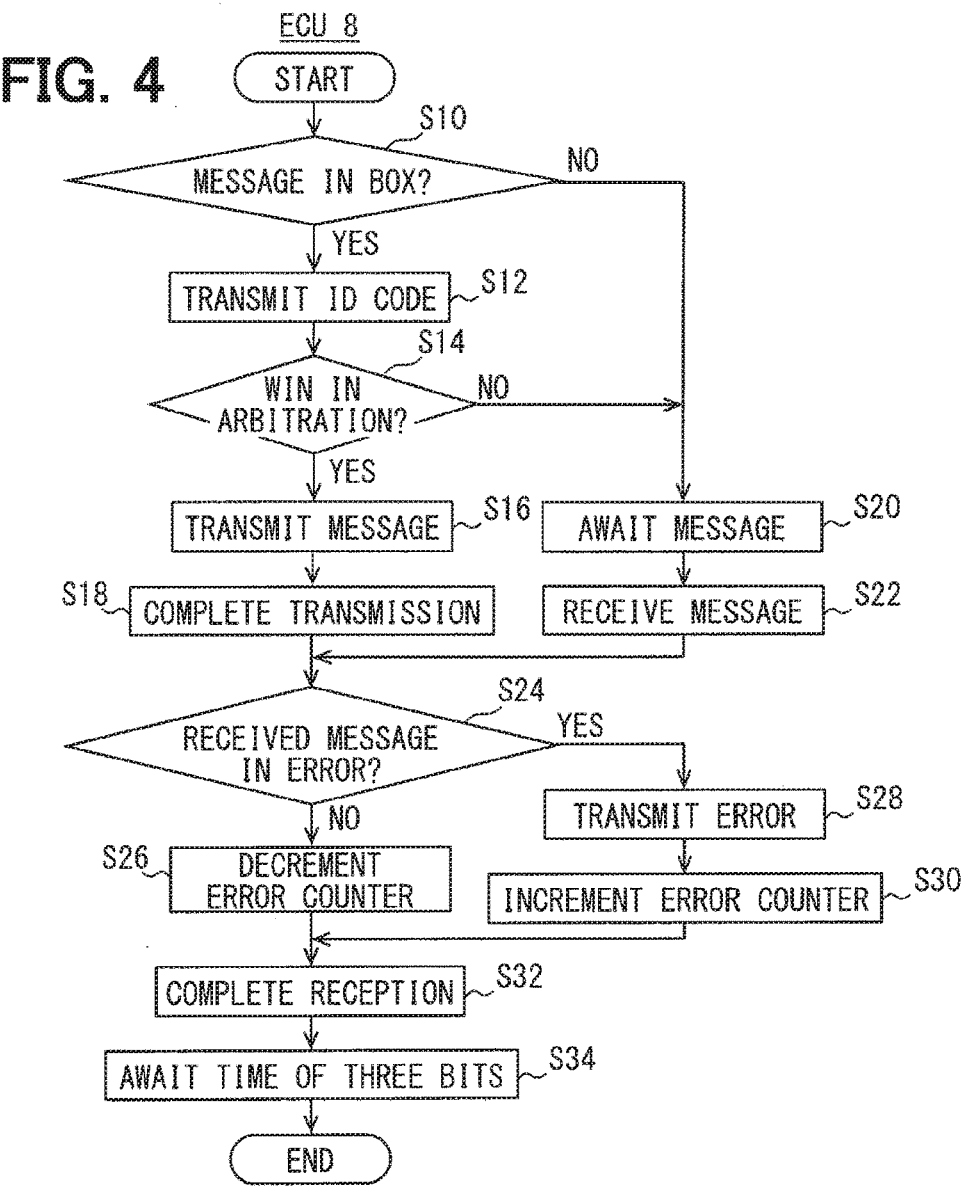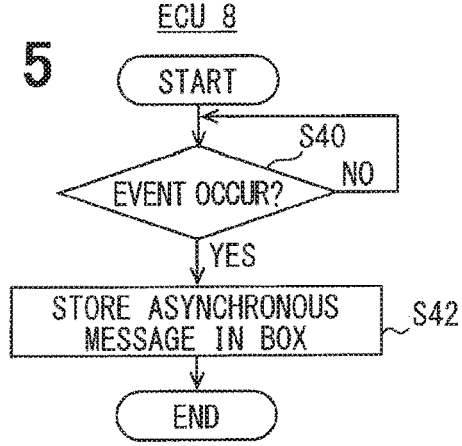

COMMUNICATION SYSTEM

CROSS REFERENCE TO RELATED APPLICATION

The present application is based on Japanese Patent Application No. 2015-244537 filed on Dec. 15, 2015, the disclosure of which is incorporated herein by reference.

TECHNICAL FIELD

The present disclosure relates to a communication system in which a plurality of electronic control units are connected through a communication line.

BACKGROUND

Patent Literature 1: JP 2011-030151 A (US 2011/0029704 A1)

For the travel control of a vehicle, a plurality of first electronic control units need to share various synchronous data acquired at substantially the same time. A known method in Patent Literature 1 permits a first electronic control unit to act as a master node and periodically transmit a reference message to a communication line, and allows a first electronic control unit to receive the reference message and transmit synchronous data in response to the received reference message.

Additionally TTCAN (ISO 11898-4) and FlexRay (registered trademark) are also known as a time trigger method in which a master node transmits periodically a period start signal so that synchronous data is transmitted at a predetermined time based on the period start signal.

If a transmission line (hereinafter referred to as the first communication line) for transmitting synchronous data is broken or a communication transceiver is faulty during the use of the above conventional methods, the synchronous data cannot be communicated through the first communication line. This signifies that the synchronous data cannot be shared between the first electronic control units, adversely affecting the travel control.

If an employed communication system includes a second communication line in addition to the first communication line, the synchronous data may be shared through the second communication line. However, the second communication line is connected not only to the first electronic control unit but also to a second electronic control unit. For example, CAN (Controller Area Network), which is standardized by ISO 11898-1, is commonly known as a communication method using the second communication line. The communication method using the second communication line assigns priorities to data to be transmitted from individual electronic control units, and performs arbitration based on the assigned priorities to establish communication between preselected electronic control units. However, the communication method using the second communication line is of an event-driven type that does not achieve synchronization between various data.

When the communication through the first communication line is abnormal, the master node may periodically transmit a high-priority reference message through the second communication line and permit the first electronic control unit to receive the reference message and successively transmit synchronous data at a predetermined time based on the reception of the reference message. This provides synchronous communication; however, asynchronous data is lost in arbitration to unduly delay its transmission.

SUMMARY

The present disclosure has been made in view of the above circumstances, and provides a communication system that, even when a communication through a first communication line is abnormal, is capable of transmitting synchronous data and reducing the transmission delay of asynchronous data.

To achieve the above object, according to an example of the present disclosure, a communication system is provided as including a first communication line, a second communication line, a plurality of first ECUs (electronic control units) connected through the first communication line, and at least one second ECU (electronic control unit) that is connected through the second communication line together with the first ECUs. One of the first ECUs acting as a master node includes a first reference signal transmitter that periodically transmits a first reference signal to the first communication line to perform time adjustment, an abnormality detector that detects an abnormality in communication established through the first communication line, and a second reference signal transmitter that periodically transmits a second reference signal to the second communication line to perform time adjustment when an abnormality is detected by the abnormality detector. The first ECUs each include a first synchronous data transmitter that transmits at least one first synchronous data item to the first communication line upon receiving the first reference signal, and a second synchronous data transmitter that transmits at least one second synchronous data item to the second communication line upon receiving the second reference signal. The first ECUs and the second ECUs each include a priority transmitter, a priority determiner, and an asynchronous data transmitter. The priority transmitter transmits priority information associated with each of asynchronous data items to the second communication line. The priority determiner determines which of (i) priority information that is transmitted locally and (ii) priority information that is transmitted from elsewhere to the second communication line, has a higher priority. The asynchronous data transmitter transmits, when the priority information transmitted locally has the higher priority, an asynchronous data item associated with the priority information transmitted locally, subsequently to the priority information transmitted locally. The second reference signal has a higher priority than a subject asynchronous data item that is at least one of the asynchronous data items, while the second synchronous data item has a higher priority than the subject asynchronous data item. The second reference signal transmitter of the first ECU acting as the master node transmits the second reference signal at a first time and the second reference signal at a second time subsequent to the first time; a transmission cycle of the second reference signal is defined as a predetermined period of time between the first time and the second time. In cases that the second synchronous data transmitter of each of the first ECUs performs a transmission of the second synchronous data item during the transmission cycle upon receiving the second reference signal at the first time, transmissions of entire second synchronous data items needed to be transmitted from the first ECUs during the transmission cycle of the second reference signal are performed at mutually different points of time such that the subject asynchronous data item is permitted to be transmitted during an interval between the transmissions of the entire second synchronous data items.

Even if the communication through the first communication line is abnormal, synchronous data or data items can be transmitted through the second communication line. Further, when the synchronous data items are to be transmitted through the second communication line, all the synchronous data items to be transmitted are transmitted at a plurality of different points of time within a predetermined period (i.e., transmission cycle of the second reference signal) between the reception of a second reference signal and the reception of the next second reference signal, and an asynchronous data item is transmitted during a predetermined interval between the points of time at which the synchronous data items are transmitted. Thus, the transmission delay of the asynchronous data item can be reduced.

BRIEF DESCRIPTION OF DRAWINGS

The above and other objects, features and advantages of the present disclosure will become more apparent from the following detailed description made with reference to the accompanying drawings. In the drawings:

FIG. 4 is a flowchart illustrating a process that is performed by each ECU in order to transmit and receive a message;

FIG. 5 is a flowchart illustrating a process performed by each ECU that transmits an asynchronous message;

DETAILED DESCRIPTION

Figure 1:
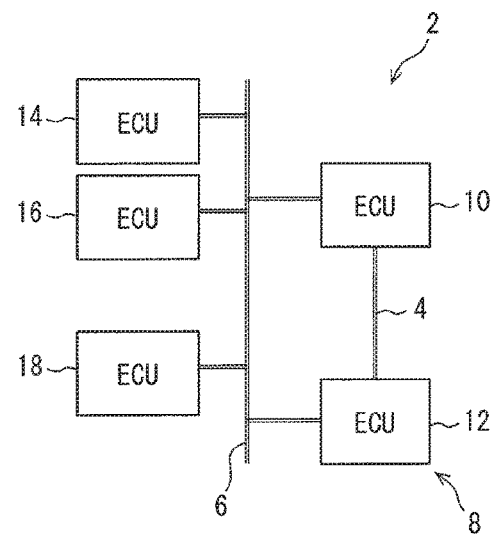
FIG. 1 is a diagram illustrating an outline configuration of a communication system according to an embodiment of the present disclosure.

Embodiments of the present disclosure will now be described with reference to the accompanying drawings. In the description of the embodiments, portions functionally and/or structurally equivalent to each other are designated by the same reference numerals.

First Embodiment

An outline configuration of a communication system according to a first embodiment will be described with reference to FIG. 1. It is assumed that not only the communication through a second communication line but also the communication through a first communication line is compliant with the CAN protocol.

As in FIG. 1, the communication system 2 includes a first communication line 4, a second communication line 6, and a plurality of ECUs 8. Here, "ECU" corresponds to "electronic control unit." The ECUs 8 include first ECUs 10, 12, which are connected through the first communication line 4, and second ECUs 14, 16, 18. The ECUs 8, which include the first ECUs 10, 12 and the second ECUs 14, 16, 18, are connected through the second communication line 6.

The communication system 2 is mounted in a vehicle such as a passenger car. In the embodiment, the communication system 2 is mounted in a hybrid vehicle. The ECUs 8 control various vehicle-mounted equipment (engine fuel injector, igniter, electric motor, braking equipment, etc.). An overall control HV ECU may be used as the first ECU 10 while an MG ECU may be used as the first ECU 12; an engine ECU, a brake ECU, and a gateway ECU may be respectively used as the second ECUs 14, 16, 18.

One of the first ECUs 10, 12 is selected as a master node. In the embodiment, the first ECU 10 is selected as the master node. As the master node, the first ECU 10 periodically transmits a reference message, which is a first reference signal for time adjustment, to the other first ECU 12 through the first communication line 4. Further, when the communication through the first communication line 4 is abnormal, the first ECU 10 periodically transmits a reference message, which is a second reference signal for time adjustment, to the other first ECU 12 through the second communication line 6. The message may be referred to as a frame.

In response to a received reference message, the first ECUs 10, 12 transmit a synchronous message(s), which includes synchronous data (i.e., a synchronous data item) for synchronization control, to the first communication line 4. Herein, a synchronous data item transmitted to the first communication line 4 may be referred to as a first synchronous data item. The synchronous data includes an engine target torque, an MG target torque, an engine revolving speed, an MG revolving speed, an MG rotational position, a battery current, and a battery voltage. In response to a received reference message, the first ECUs 10, 12 transmit a synchronous message(s), which includes synchronous data (i.e., a synchronous data item) for synchronization control to the second communication line 6. Herein, a synchronous data item transmitted to the second communication line 6 may be referred to as a second synchronous data item. The second ECUs 14, 16, 18 transmit an asynchronous message, which includes asynchronous data (i.e., an asynchronous data item), in response to a message transmission request generated based on a predetermined phenomenon and without regard to the reception of a reference message.

Here, "data" may be singular or plural. To clearly indicate whether data is singular or plural, a data item may be used in the present application. In other words, a single data may be expressed as a (single) data item, whereas several data may be expressed as (several) data items. Furthermore, information may be used as being countable as well as uncountable. That is, information may be equivalent to an information item; informations may be equivalent to information items.

In the communication system 2 according to the embodiment, predefined priorities are assigned to messages (synchronous message and asynchronous message) transmitted by the ECUs 8 based on the importance and type of included data, as is the case with a conventional CAN. Further, when a message is to be transmitted, priority information (ID code) is always transmitted together with the message to indicate the priority of the message. If a plurality of message priority information transmissions conflict with each other, arbitration is performed so as to give a transmission right to priority information having relatively high priority.

The reference message transmitted by the first ECU 10 acting as the master node has higher priority than any synchronous message transmitted by the other first ECU 12 and an asynchronous message transmitted by the other ECUs 8 (12-18). Therefore, even if the transmission of the reference message conflicts with the transmission of a different message, the transmission of the reference message can be prevented from being delayed by a loss in arbitration. Thus, the master node can transmit the reference message at substantially fixed intervals. In the embodiment, the priority information has a reference message trigger function, and synchronous data is contained in a data region in the reference message (frame). This eliminates the necessity of transmitting a triggering reference signal for time adjustment.

Hardware configurations of the ECUs 8 will now be described with reference to FIGS. 2 and 3.

The ECUs 8 (10-18) each have a well-known hardware configuration that provides CAN communication. The first ECUs 10, 12 have the same hardware configuration. The second ECUs 14, 16, 18 have the same hardware configuration. As examples, the hardware configurations of the first ECU 10 and the second ECU 14 are briefly described below.

Figure 2:
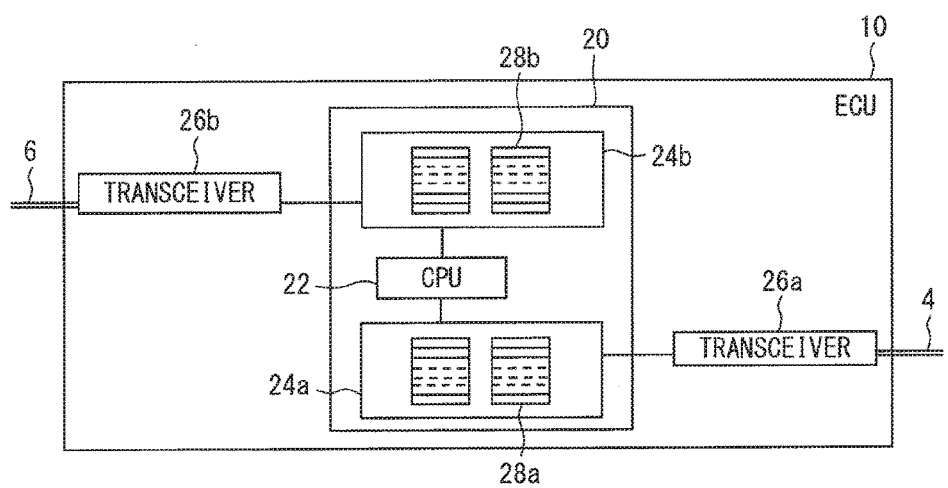
FIG. 2 is a diagram illustrating an internal configuration of a first ECU for communication.

As in FIG. 2, the first ECU 10 includes a microcomputer 20. The microcomputer 20 is formed of a well-known computer having a CPU 22, a RAM (unshown), a ROM (unshown), and controllers 24a, 24b. The controller 24a controls the communication with the other first ECU 12 in compliance with the CAN protocol. The controller 24b controls the communication with the other ECUs 8 (12-18) in compliance with the CAN protocol. The CPU 22 performs various control processes in coordination with the other ECUs 8 (12-18) by exchanging messages with the other ECUs 8 through the controllers 24a, 24b.

The first ECU 10 further includes a transceiver 26a and a transceiver 26b. The transceiver 26a transmits and receives a synchronous message, which is generated by the controller 24a, through the first communication line 4. The transceiver 26b transmits and receives messages (synchronous message and asynchronous message), which are generated by the controller 24b, through the second communication line 6.

As is well known, the controllers 24a, 24b each include a plurality of message boxes 28a, 28b for storing data exchanged between the ECUs 8. The controller 24a exercises transmission control, reception control, arbitration control (bit-by-bit non-destructive arbitration control), and communication control. The transmission control is exercised to convert synchronous data to a message (a frame) based on a value stored in the message box 28a and transmit the resulting message (frame) to the associated first communication line 4 through the transceiver 26a. The reception control is exercised to receive a synchronous message through the transceiver 26a and extract synchronous data.

The arbitration control is exercised over a transmission right when synchronous messages conflict on the first communication line 4. The communication control is exercised in compliance with the CAN protocol over the detection and notification of an error caused in relation to the transmission and reception of a synchronous message.

Similarly, the controller 24b exercises transmission control, reception control, arbitration control, and communication control. The transmission control is exercised to convert data (synchronous data and asynchronous data) to a message based on a value stored in the message box 28b and transmit the resulting message to the associated second communication line 6 through the transceiver 26b. The reception control is exercised to receive a message through the transceiver 26b and extract data. The arbitration control is exercised over a transmission right when messages conflict on the second communication line 6. The communication control is exercised in compliance with the CAN protocol over the detection and notification of an error caused in relation to the transmission and reception of a message.

When any data is to be transmitted to the other ECUs 8 (12-18), the microcomputer 20 determines priority information (hereinafter referred to as the ID code) indicative of the priority of the data from the contents of the data, and stores the data and the ID code in a data register and ID code register of the message box 28a, 28b of the associated controller 24a, 24b. In this instance, a use designation register attached to the message box 28a, 28b is set for transmission.

When a message to be transmitted is stored in the message box 28a, 28b of the controller 24a, 24b by the microcomputer 20, the controller 24a, 24b exercises transmission control so as to create a message based on a value (ID code and data) stored in the message box 28a, 28b, which is designated by the use designation register for transmission purposes, and transmit the created message through the transceiver 26a, 26b.

Figure 3:
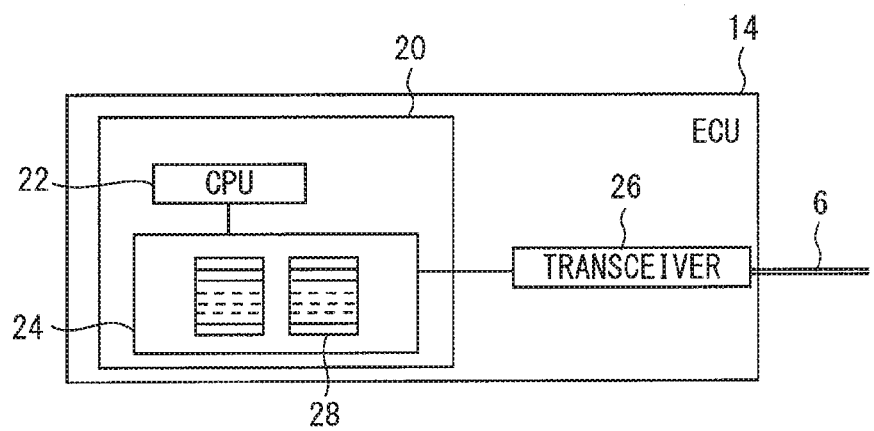
FIG. 3 is a diagram illustrating an internal configuration of a second ECU for communication.

As in FIG. 3, the second ECU 14 includes a controller 24 and a transceiver 26, which are used to transmit and receive an asynchronous message through the second communication line 6. The other elements of the second ECU 14 are the same as those of the first ECU 10.

A process performed by all the ECUs 8 (10-18) to transmit and receive a message will now be described with reference to FIG. 4.

It is noted that a flowchart or the processing of the flowchart in the present application includes sections (also referred to as steps), each of which is represented, for instance, as S10. Further, each section can be divided into several sub-sections while several sections can be combined into a single section; each of thus configured sections can be also referred to as a device or module. Furthermore, such a section along with a structural modifier may be also referred as another name; for instance, an abnormality detection section may be also referred to as an abnormality detector. Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

In S10, a determination is performed as to whether a message is stored in the associated transmission message box 28, 28a, 28b. If the result of the determination indicates that a message is stored, processing proceeds to S12. If the result of the determination indicates that no message is stored, processing proceeds to S20.

In S12, an ID code associated with the stored message is transmitted from the ECU 8 itself. If the communication through the first communication line 4 is normal, the first ECU 10, 12 transmits the ID code stored in the transmission message box 28a to the first communication line 4. By contrast, if the communication through the first communication line 4 is abnormal, the first ECU 10, 12 transmits the ID code stored in the transmission message box 28b to the second communication line 6. The second ECU 14, 16, 18 transmits an ID code stored in the message box 28 of the controller 24 to the second communication line 6.

In S14, a determination is performed as to whether the transmitted ID code transmitted locally (i.e., from the ECU 8 itself) indicates a win in arbitration against another ID code transmitted from elsewhere (i.e., from any one of the other ECUs 8 excluding the ECU 8 itself). If the result of determination indicates a win in arbitration, processing proceeds to S16. If the result of determination indicates a loss in arbitration, processing proceeds to S20.

In S16, the remaining portion of the message, which includes the data, is transmitted subsequently to the transmission of the ID code. Subsequently, if the result of determination in S18 indicates the completion of message transmission, processing proceeds to S24.

Meanwhile, in S20, the reception of a message from the other ECU 8 is awaited. If the result of determination in S22 indicates that the message is received, processing proceeds to S24.

In S24, a determination is performed as to whether the received message is in protocol error. If the result of determination in S24 indicates that the received message is not in protocol error, processing proceeds to S26 and decrements an error counter. After the error counter is decremented, processing proceeds to S32.

If the result of determination in S24 indicates that the received message is in protocol error, processing proceeds to S28. In S28, an error message is generated and transmitted. If the controller 24a in the first ECU 10, 12 receives the message, the error message is transmitted to the first communication line 4. By contrast, if the controller 24b in the first ECU 10, 12 receives the message, the error message is transmitted to the second communication line 6.

Upon completion of error message transmission, processing proceeds to S30 and increments the error counter. After the error counter is incremented, processing proceeds to S32. If the result of determination in S32 indicates that the reception of the message is completed, processing proceeds to S34. In S34, the end of standby time equivalent to three bits is awaited. Upon completion of S34, processing terminates. The above process is repeatedly performed. The standby time is not limited to three bits. An alternative standby time may be used as far as each of successive messages can be identified. Three bits are equivalent to the minimum period of time that is adequate for such identification.

When the process indicated in the flowchart of FIG. 4 is performed, each ECU 8 can exercise control over transmission, reception, and arbitration in compliance with the conventional CAN protocol. More specifically, the first ECUs 10, 12 can exercise control over transmission, reception, and arbitration in compliance with the CAN protocol no matter whether communication is established through the first communication line or the second communication line 6.

A process performed by the ECUs 8 (10-18) to transmit an asynchronous message in response to the occurrence of a predefined event without regard to the reception of a reference message will now be described with reference to FIG. 5.

In S40, a determination is performed, as in FIG. 5, as to whether a predefined event has occurred. If the result of determination indicates that a predefined event has occurred, processing proceeds to S42. In S42, an asynchronous message to be transmitted in response to the event is stored in the transmission message box 28, 28b. More specifically, the asynchronous data to be transmitted and the ID code associated with the asynchronous data are stored in the transmission message box 28, 28b.

When the above process is performed to store the asynchronous data in the message box 28, 28b associated with the second communication line 6, the result of determination in S10 of FIG. 4 indicates that a message is stored.

Figure 6:
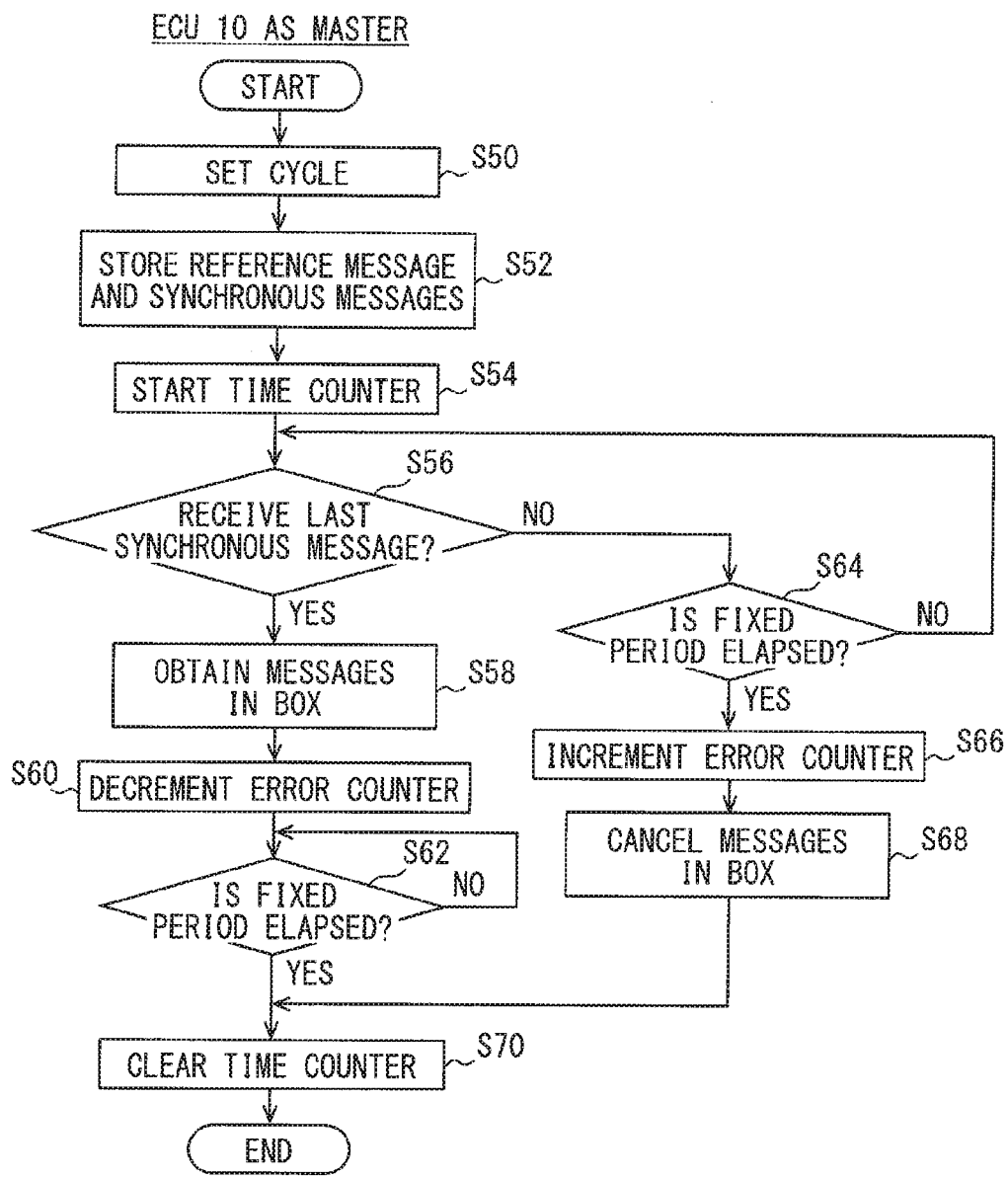
FIG. 6 is a flowchart illustrating a process that is performed by the first ECU acting as a master node when a communication through a first communication line is normal.
Figure 7:
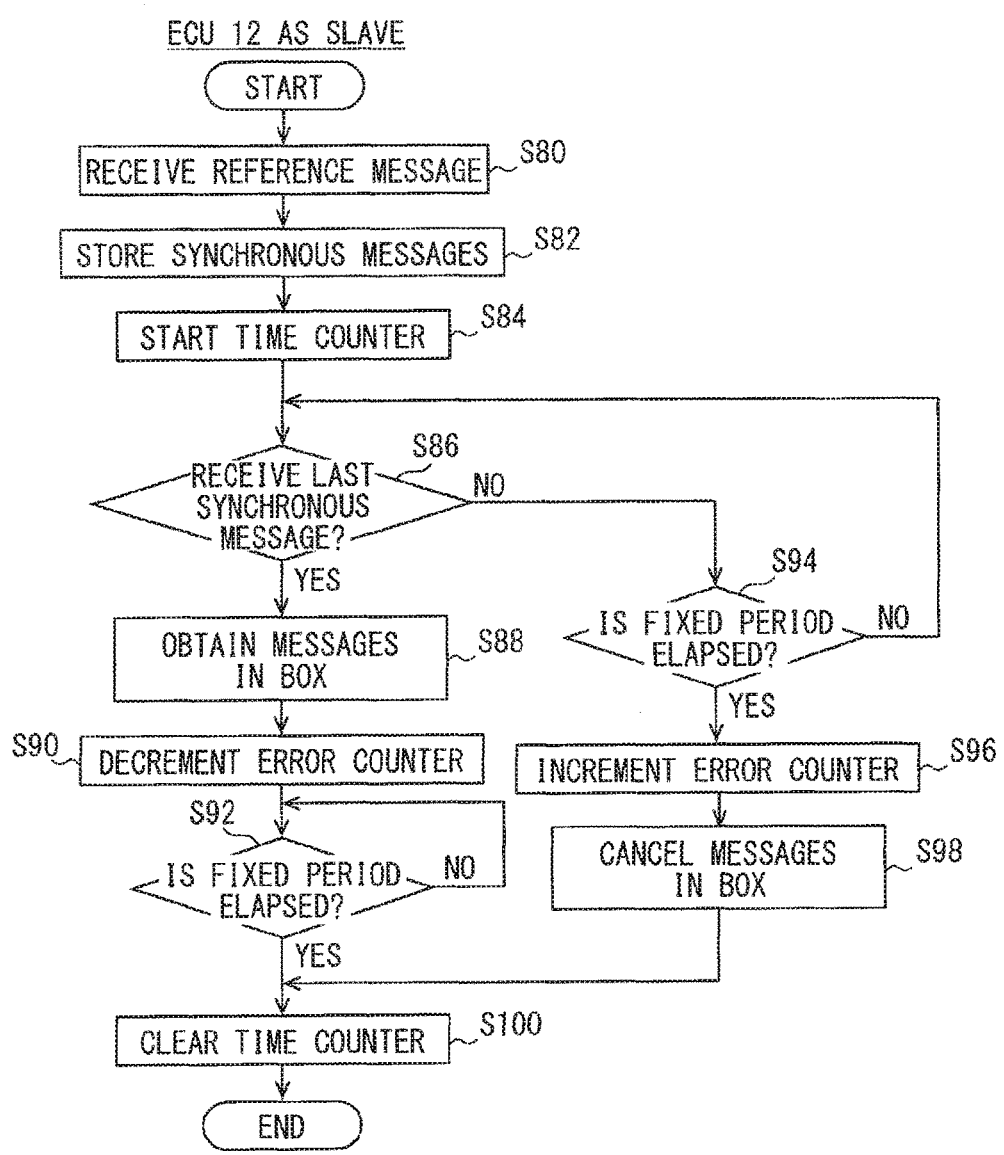
FIG. 7 is a flowchart illustrating a process that is performed by the first ECU acting as a slave node when a communication through the first communication line is normal.

A process performed by the first ECU 10 acting as a master node when communication through the first communication line 4 is normal will now be described with reference to FIG. 6. Further, a process performed by the first ECU 12 acting as a slave node when communication through the first communication line 4 is normal will be additionally described with reference to FIG. 7.

Firstly, the process performed by the first ECU 10 will be described. The first ECU 10 repeatedly performs the process described below on a periodic basis at intervals (i.e., cycle) of 4 ms, for instance. In S50, intervals (i.e., cycle or transmission cycle) are set, the intervals at which a reference message serving as the first reference signal is transmitted. In S52, the reference message and a synchronous message(s), which is to be transmitted in association with the reference message, are stored in the transmission message box 28a. Upon completion of storage, processing proceeds to S54. When the synchronous message(s) is stored in the message box 28a as described, the result of determination in S10 of FIG. 4 indicates that a message is stored.

In S54, counting of the elapsed time starts from the instant at which the transmission of the reference message is substantially initiated. The reference message transmitted to the first communication line 4 is received by the controller 24a through the transceiver 26a. As the time of reception is substantially equal to the time of transmission, the counting of the elapsed time starts upon receipt of the reference message.

In S56, a determination is performed as to whether the last synchronous message is received. The last synchronous message is among a plurality of synchronous messages transmitted during one cycle of reference message transmission, assigned the lowest priority, and transmitted last. The reception of the last synchronous message is identified by its ID code. If the result of determination in S56 indicates that the last synchronous message is received, processing proceeds to S58. If the result of determination indicates that the last synchronous message is not received, processing proceeds to S64.

In S58, any synchronous data is obtained from a reception message box. The CPU 22 uses the obtained synchronous data to exercise synchronization control. Upon completion of S58, processing proceeds to S60 and decrements an abnormality counter, which counts the number of abnormalities (i.e., an abnormalities count) in communication established through the first communication line 4. Upon completion of S60, processing proceeds to S62.

In S62, a determination is performed as to whether a fixed period of time has elapsed. The fixed period of time is equivalent to one cycle (i.e., transmission cycle) of periodic reference message transmission to the first communication line 4. If the result of determination in S62 indicates that the fixed period of time has elapsed, processing proceeds to S70.

If the result of determination in S56 indicates that the last synchronous message is not received, processing proceeds to S64 and determines whether the fixed period of time has elapsed. S64 is the same as S62. If the result of determination in S64 indicates that the fixed period of time has elapsed, processing proceeds to S66. By contrast, if the result of determination in S64 indicates that the fixed period of time has not elapsed, processing returns to S56. That is, S56 and S64 will be repeated until the last synchronous message is received.

In S66, the abnormality counter is incremented. Upon completion of S66, processing proceeds to S68 and cancels the transmission and reception message boxes 28a. More specifically, all messages in the message boxes 28a are cancelled or discarded. Upon completion of S68, processing proceeds to S70. In S70, the elapsed time count is cleared to terminate a series of processing.

Secondly, the first ECU 12 will be described. A reference message is received in S80 as in FIG. 7. In S82, a synchronous message(s) to be transmitted in response to the reference message is stored in the transmission message box 28a. Upon completion of storage, processing proceeds to S84. When the synchronous message(s) is stored in the transmission message box 28a as mentioned, the result of determination in S10 of FIG. 4 indicates that a message is stored.

As is the case with S54, S84 starts counting the elapsed time from the instant at which the reference message is substantially received.

In S86, a determination is performed as to whether the last synchronous message is received, as is the case with S56. If the result of determination indicates that the last synchronous message is received, processing proceeds to S88. If the result of determination indicates that the last synchronous message is not received, processing proceeds to S94.

In S88, any synchronous data is obtained from the reception message box. The CPU 22 uses the obtained synchronous data to exercise synchronization control. Upon completion of S88, processing proceeds to S90 and decrements the abnormality counter. Upon completion of S90, processing proceeds to S92.

In S92, a determination is performed as to whether the fixed period of time has elapsed, as is the case with S62. If the result of determination indicates that the fixed period of time has elapsed, processing proceeds to S100.

Meanwhile, if the result of determination in S86 indicates that the last synchronous message is not received, processing proceeds to S94 and determines whether the fixed period of time has elapsed. This is the same as S92. If the result of determination in S94 indicates that the fixed period of time has elapsed, processing proceeds to S96. By contrast, if the result of determination in S94 does not indicate that the fixed period of time has elapsed, processing returns to S86.

In S96, the abnormality counter is incremented. Upon completion of S96, processing proceeds to S98 and cancels the transmission message box and the reception message box. Upon completion of S98, processing proceeds to S100. In S100, the elapsed time count is cleared to terminate a series of processing.

Figure 8:
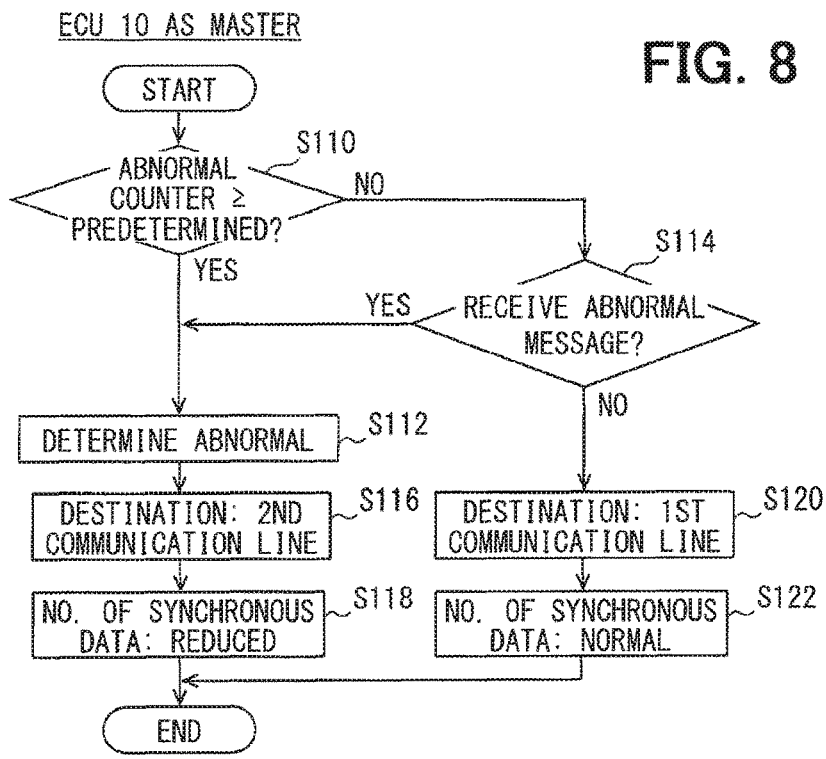
FIG. 8 is a flowchart illustrating a process that is performed by the first ECU acting as the master node.
Figure 9:
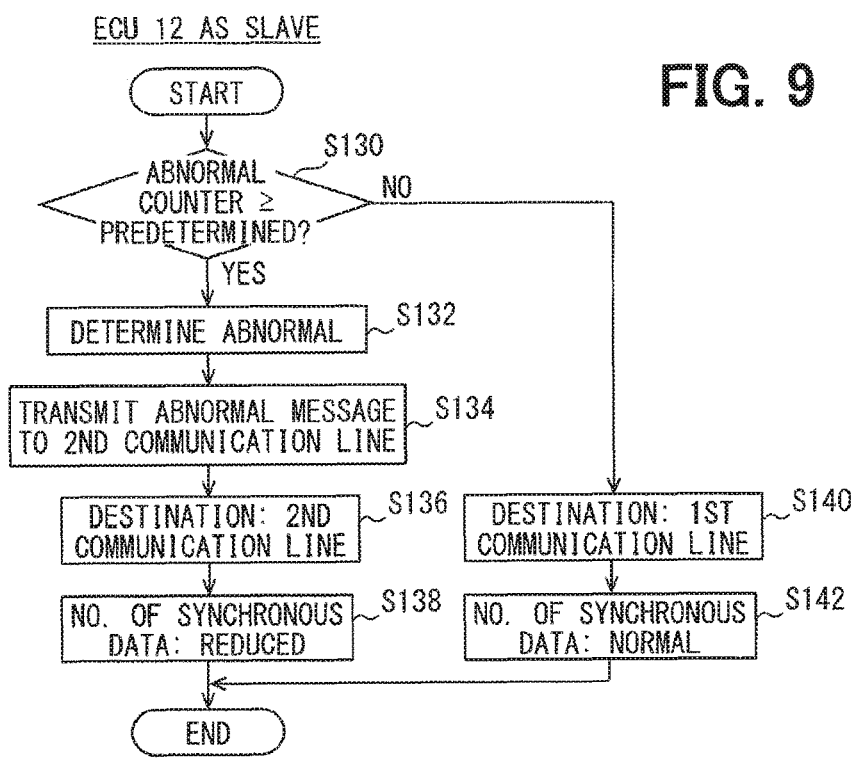
FIG. 9 is a flowchart illustrating a process that is performed by the first ECU acting as the slave node.

Processes performed by the first ECUs 10, 12 when communication through the first communication line 4 is abnormal will now be described with reference to FIGS. 8 and 9.

Firstly, the process performed by the first ECU 10 will be described. The first ECU 10 periodically performs the following process. In S110, a determination is performed as to whether the value of the abnormality counter is equal to or greater than a predetermined value, as in FIG. 8. If the result of determination in S110 indicates that the value of the abnormality counter is not smaller than a predetermined value, processing proceeds to S112. If the value is determined to be smaller than the predetermined value, processing proceeds to S114.

If it is determined in S112, that a communication abnormality has occurred, processing proceeds to S116. In S116, a process is performed to change the destination of synchronous-message transmission from the first communication line 4 to the second communication line 6, that is, a process is performed to set the second communication line 6 as the destination of the synchronous-message transmission. In S118, the number of synchronous data (i.e., the number of synchronous data items or a synchronous data count) to be transmitted to the second communication line 6 is set to be smaller than the number of synchronous data to be transmitted to the first communication line 4. Upon completion of S118, a series of processing terminates. When the above process is performed, the CPU 22 of the first ECU 10 stores the synchronous message(s) in the message box 28b of the controller 24b on the side toward the second communication line 6. Further, when S16 of FIG. 4 is performed, synchronous messages are transmitted with the number of data (i.e., the number of data items) reduced.

In S114, a determination is performed as to whether a message indicative of a communication abnormality is transmitted from the other first ECU 12 and received. If the result of determination indicates that a communication abnormality message is received, processing proceeds to S112. By contrast, if the result of determination indicates that no communication abnormality message is received, processing proceeds to S120 and performs a process to set the first communication line 4 as the destination of synchronous-message transmission. In S122, the number of synchronous data to be transmitted is set to a normal value. Upon completion of S122, a series of processing terminates.

S110 and S114 need not always be performed in the order named. An alternative is to perform S114 earlier than S110. Another alternative is to perform S110 and S114 separately.

Secondly, the process performed by the first ECU 12 will be described. In S130, a determination is performed as to whether the value of the abnormality counter is equal to or greater than the predetermined value, as is the case with S110. If the result of determination indicates that the value of the abnormality counter is equal to or greater than the predetermined value, processing proceeds to S132. If the value of the abnormality counter is determined to be smaller than the predetermined value, processing proceeds to S140.

If it is determined in S132 that a communication abnormality has occurred, processing proceeds to S134 and transmits a message indicative of the occurrence of the communication abnormality to the second communication line 6. In S136, a process is performed to change the destination of synchronous-message transmission from the first communication line 4 to the second communication line 6, that is, a process is performed to set the second communication line 6 as the destination of the synchronous-message transmission. In S138, the number of synchronous data to be transmitted to the second communication line 6 is set to be smaller than the number of synchronous data to be transmitted to the first communication line 4. Upon completion of S138, a series of processing terminates. When the above process is performed, the CPU 22 of the first ECU 12 stores the synchronous message(s) in the message box 28*b* of the controller 24*b* on the side toward the second communication line 6.

In S140, a process is performed to set the first communication line 4 as the destination of synchronous-message transmission. In S142, the number of synchronous data to be transmitted is set to a normal value. Upon completion of S142, a series of processing terminates.

Figure 10:
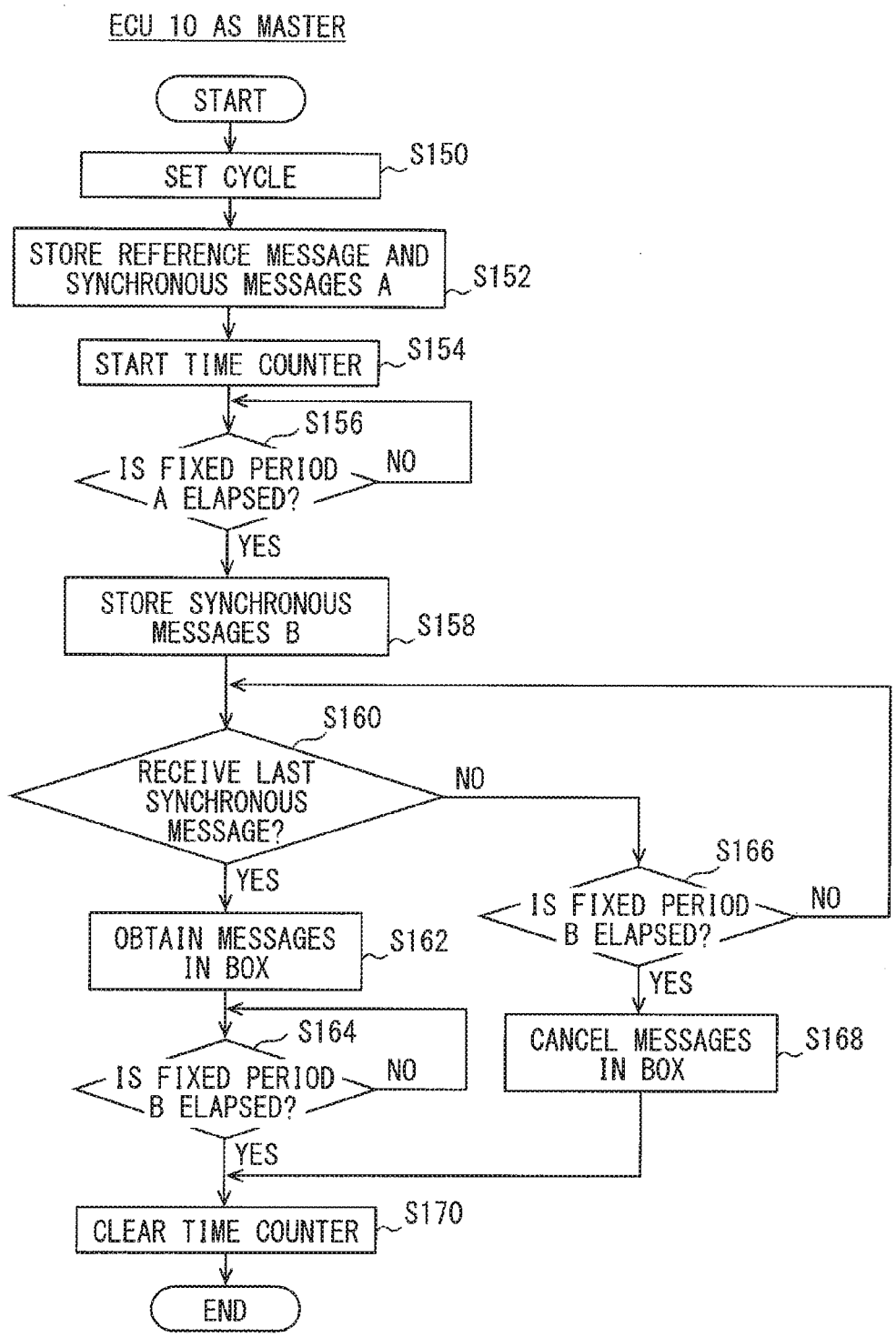
FIG. 10 is a flowchart illustrating a process that is performed by the first ECU acting as the master node when a communication through the first communication line is abnormal.
Figure 11:
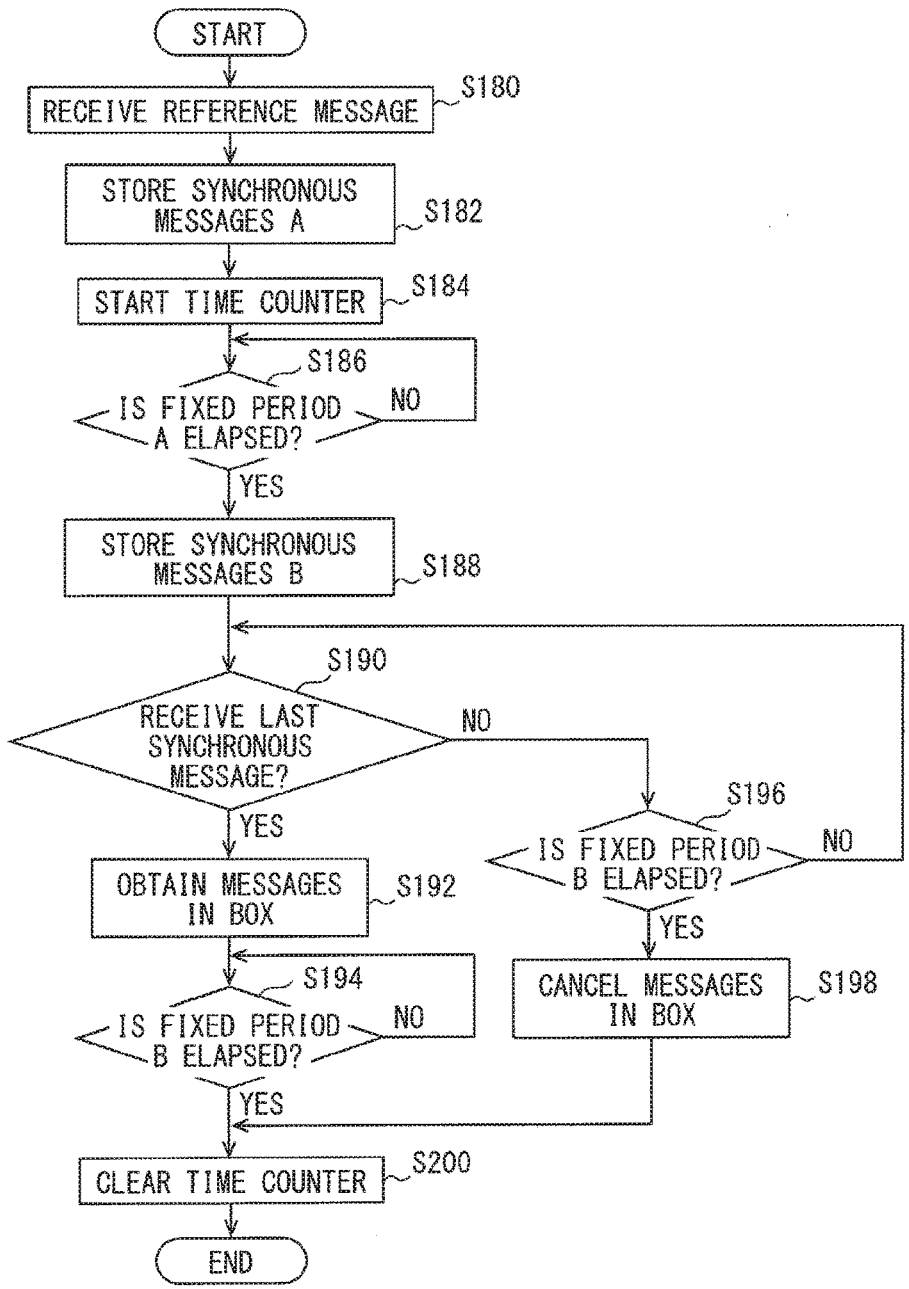
FIG. 11 is a flowchart illustrating a process that is performed by the first ECU acting as the slave node when a communication through the first communication line is abnormal.

A process performed by the first ECU 10 acting as a master node when communication through the first communication line 4 is abnormal will now be described with reference to FIG. 10. Further, a process performed by the first ECU 12 acting as a slave node when communication through the first communication line 4 is abnormal will be additionally described with reference to FIG. 11.

Firstly, the process performed by the first ECU 10 will be described. The first ECU 10 repeatedly performs the process described below on a periodic basis. As in FIG. 10, in S150, intervals (i.e., cycle or transmission cycle) are set, the intervals at which a reference message serving as the second reference signal is transmitted. The intervals at which the reference message (second reference signal) is transmitted to the second communication line 6 may be identical with or different from the intervals at which the reference message (first reference signal) is transmitted to the first communication line 4. If they are identical with each other, synchronization control based on a synchronous message can be maintained consistent even when the communication line to which the synchronous data is transmitted is changed. If the intervals at which the reference message is transmitted to the second communication line 6 are longer than the intervals at which the reference signal is transmitted to the first communication line 4, an increased number of asynchronous messages can be transmitted in addition to the synchronous messages during one transmission cycle.

In the embodiment, it is assumed that a plurality of synchronous data (i.e., data items) are transmitted, that is, synchronous messages are separated into two groups, namely, group A and group B, and transmitted by performing two respective transmission operations. A synchronous message(s) in group A will be referred to as synchronous message(s) A, and a synchronous message(s) in group B will be referred to as synchronous message(s) B.

In S152, the reference message and synchronous message(s) A, which is to be transmitted in association with the reference message, are stored in the transmission message box 28*b*. The reference message transmitted to the second communication line 6 is received by the controller 24*b* through the transceiver 26*b*. Synchronous message(s) A is transmitted at a predetermined point of time associated with the reception of the reference message. Synchronous message(s) A is transmitted subsequently to the reference message because the ID code of synchronous message(s) A has the second highest priority after that of the reference message. Upon completion of message storage, processing proceeds to S154. When synchronous message(s) A is stored in the message box 28*b* as described, the result of determination in S10 of FIG. 4 indicates that a message is stored.

In S154, counting of the elapsed time starts from the instant at which the transmission of the reference message is substantially initiated, as is the case with S54. In S156, a determination is performed as to whether a fixed period of time A has elapsed. In order to obtain a transmission time adequate for synchronous message(s) B, the fixed period of time A is set to be shorter than the intervals (i.e., transmission cycle) at which the reference message is periodically transmitted to the second communication line 6. If the number of synchronous messages A is approximately equal to the number of synchronous messages B, the fixed period of time may be set to be half the intervals (i.e., transmission cycle) at which the reference message is transmitted. If the result of determination in S156 indicates that the fixed period of time A has elapsed, processing proceeds to S158.

In S158, synchronous message(s) B is stored in the transmission message box 28*b*. Synchronous message(s) B is stored after the fixed period of time A has elapsed. Further, the ID code of synchronous message(s) B has the second highest priority after that of synchronous message(s) A. Therefore, synchronous message(s) B is transmitted at a predetermined point of time associated with the reception of the reference message. Upon completion of message storage, processing proceeds to S160. When synchronous message(s) B is stored in the message box 28*b* as described, the result of determination in S10 of FIG. 4 indicates that a message is stored.

In S160, a determination is performed as to whether the last synchronous message is received. The last synchronous message is among a plurality of synchronous messages (synchronous messages A and B) transmitted during one cycle of reference message transmission, assigned an ID code having the lowest priority, and transmitted last. Therefore, the reception of the last synchronous message is identified by its ID code. If the result of determination in S160 indicates that the last synchronous message is received, processing proceeds to S162. If the result of determination indicates that the last synchronous message is not received, processing proceeds to S166.

In S162, any synchronous data is obtained from the reception message box 28*b*. The CPU 22 uses the obtained synchronous data to exercise synchronization control. Upon completion of S162, processing proceeds to S164. In S164, a determination is performed as to whether a fixed period of time B has elapsed. The fixed period of time B corresponds to one cycle of reference message transmission. If the result of determination in S164 indicates that the fixed period of time B has elapsed, processing proceeds to S170.

Meanwhile, in S166, a determination is performed as to whether the fixed period of time B has elapsed. This is the same as S164. If the result of determination in S166 indicates that the fixed period of time B has elapsed, processing proceeds to S168. If the result of determination does not indicate that the fixed period of time B has elapsed, processing returns to S160.

In S168, the transmission and reception message boxes 28*b* are canceled. Upon completion of S168, processing proceeds to S170. In S170, the elapsed time count is cleared to terminate a series of processing.

Secondly, the process performed by the first ECU 12 will be described. A reference message is received in S180 as in FIG. 11. In S182, synchronous message(s) A, which is to be transmitted in response to the reference message, is stored in the transmission message box 28*b*. Upon completion of message storage, processing proceeds to S184. When the synchronous message(s) is stored in the message box 28*b* as described, the result of determination in S10 of FIG. 4 indicates that a message is stored.

In S184, counting of the elapsed time starts from the instant at which the reference message is substantially received, as is the case with S154.

In S186, a determination is performed as to whether the fixed period of time A has elapsed, as is the case with S156. If the result of determination in S186 indicates that the fixed period of time A has elapsed, processing proceeds to S188.

In S188, synchronous message(s) B is stored in the transmission message box 28b. Upon completion of message storage, processing proceeds to S190. When synchronous message(s) B is stored in the message box 28b as described, the result of determination in S10 of FIG. 4 indicates that a message is stored.

In S190, a determination is performed as to whether the last synchronous message is received, as is the case with S160. If the result of determination in S190 indicates that the last synchronous message is received, processing proceeds to S192. If, by contrast, the result of determination indicates that the last synchronous message is not received, processing proceeds to S196.

In S192, any synchronous data is obtained from the reception message box 28b. The CPU 22 uses the obtained synchronous data to exercise synchronization control. Upon completion of S192, processing proceeds to S194. In S194, a determination is performed as to whether a fixed period of time B has elapsed, as is the case with S164. If the result of determination in S194 indicates that the fixed period of time B has elapsed, processing proceeds to S200.

Meanwhile, in S196, a determination is performed as to whether the fixed period of time B has elapsed. This is the same as S194. If the result of determination in S196 indicates that the fixed period of time B has elapsed, processing proceeds to S198. If the result of determination does not indicate that the fixed period of time B has elapsed, processing returns to S190.

In S198, the transmission box and the reception message box are canceled. Upon completion of S198, processing proceeds to S200. In S200, the elapsed time count is cleared to terminate a series of processing.

A load detection process on the second communication line 6, which is performed by the first ECU 10 acting as a master node, will be described with reference to FIG. 12. The first ECU 10 periodically performs the process described below.

Figure 12:
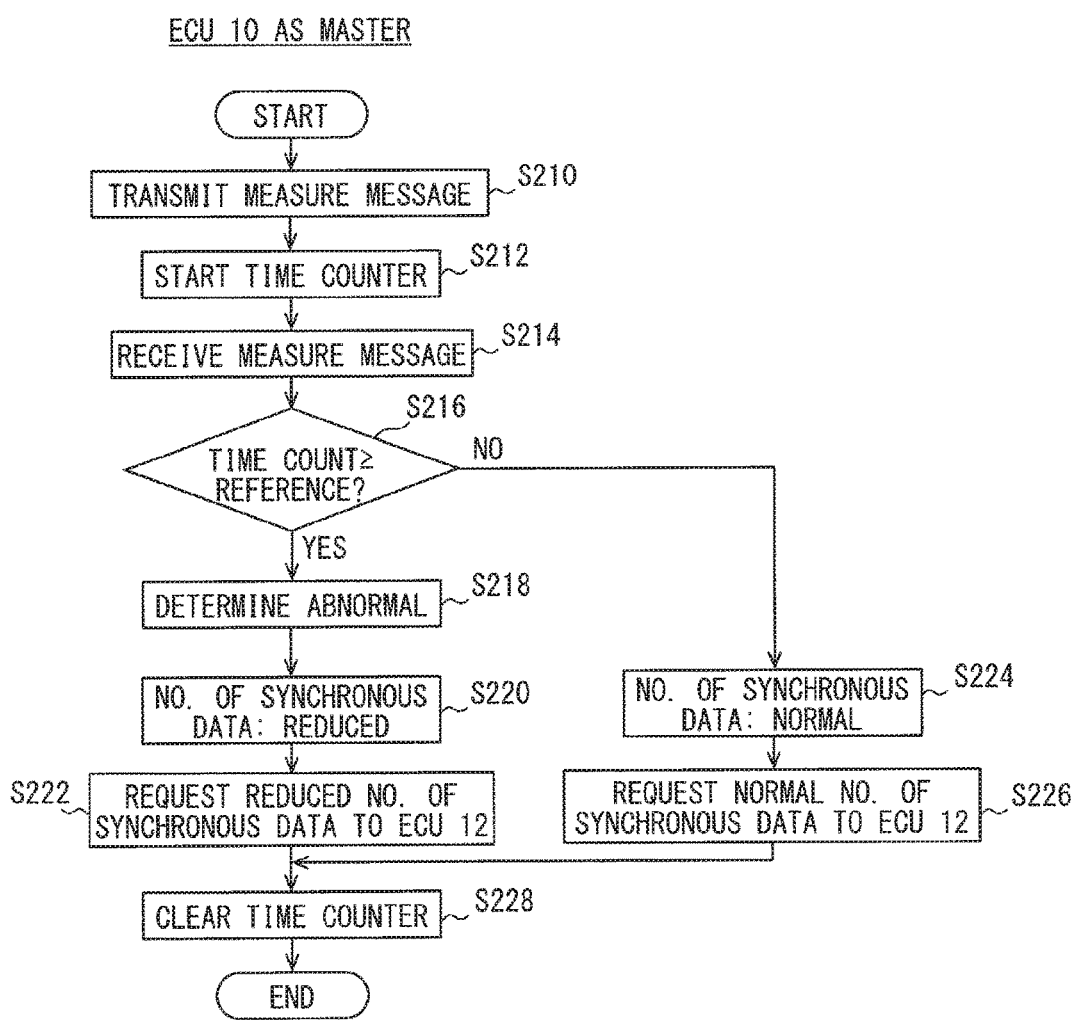
FIG. 12 is a flowchart illustrating a process of detecting a load on a second communication line.

In S210, a measurement message for detecting a load on the second communication line 6 is transmitted to the second communication line 6, as in FIG. 12. In S212, counting of the elapsed time starts from the instant at which the measurement message is substantially transmitted. Here, the elapsed time or time count may be referred to as a measurement period of time. In S210, such a measurement period of time is started to be counted. Further, the measurement message may include a measured data item. In S214, the measurement message is received. In S216, a determination is performed as to whether the time count is equal to or greater than a reference period of time. If the result of determination in S216 indicates that the time count is not smaller than the reference period of time, processing proceeds to S218. If the result of determination indicates that the time count is smaller than the reference period of time, processing proceeds to S224.

If the time count is determined to be not smaller than the reference period of time, the result of determination in S218 indicates an abnormality, that is, indicates that the load on the second communication line 6 is high. In S220, the number of synchronous data (i.e., data items) to be transmitted during one cycle of reference message transmission is set to be smaller than a normal value. In S222, a message indicative of a reduction request is transmitted to the first ECU 12 acting as a slave node in order to reduce the number of synchronous messages to be transmitted during one cycle. Upon completion of S222, processing proceeds to S228.

If a high load is imposed on the second communication line 6, the number of synchronous data to be transmitted to the second communication line 6 can be reduced in S220. Further, when S16 of FIG. 4 is performed, synchronous messages are transmitted with the number of data reduced.

Meanwhile, if the time count is determined to be smaller than the reference period of time, that is, if the load on the second communication line 6 is determined to be not high, the number of synchronous data to be transmitted during one cycle of reference message transmission is set to the normal value. Then, in S226, a message indicative of a normalization request is transmitted to the first ECU 12 acting as the slave node in order to set the number of synchronous messages to the normal value. Upon receipt of the normalization request, the first ECU 12 sets the number of synchronous data to the normal value. After the number of synchronous data is normalized, processing proceeds to S228.

In S228, the elapsed time count is cleared to terminate a series of processing.

S12 and S52 correspond to a first reference signal transmission section or a first reference signal transmitter. S110, S112, and S114 correspond to an abnormality detection section or an abnormality detector. S12 and S152 correspond to a second reference signal transmission section or a second reference signal transmitter. S16, S52, and S82 correspond to a first synchronous data transmission section or a first synchronous data transmitter. S16, S152, S158, S182, and S188 correspond to a second synchronous data transmission section or a second synchronous data transmitter. S12 and S40 correspond to a priority transmission section or a priority transmitter. S14 corresponds to a priority determination section or a priority determiner. S16 corresponds to an asynchronous data transmission section or an asynchronous data transmitter.

S56, S86, S160, and S190 correspond to a reception completion determination section or a reception completion determiner. S68, S98, S168, and S198 correspond to a data cancel section or a data canceller. S190 corresponds to a measured data transmission section or a measured data transmitter. S216 corresponds to a load detection section or a load detector. S220 and S222 correspond to a data count setting section or a data count setter.

Advantageous effects of the communication system 2 according to the embodiment will now be described with reference to FIG. 13.

Figure 13:
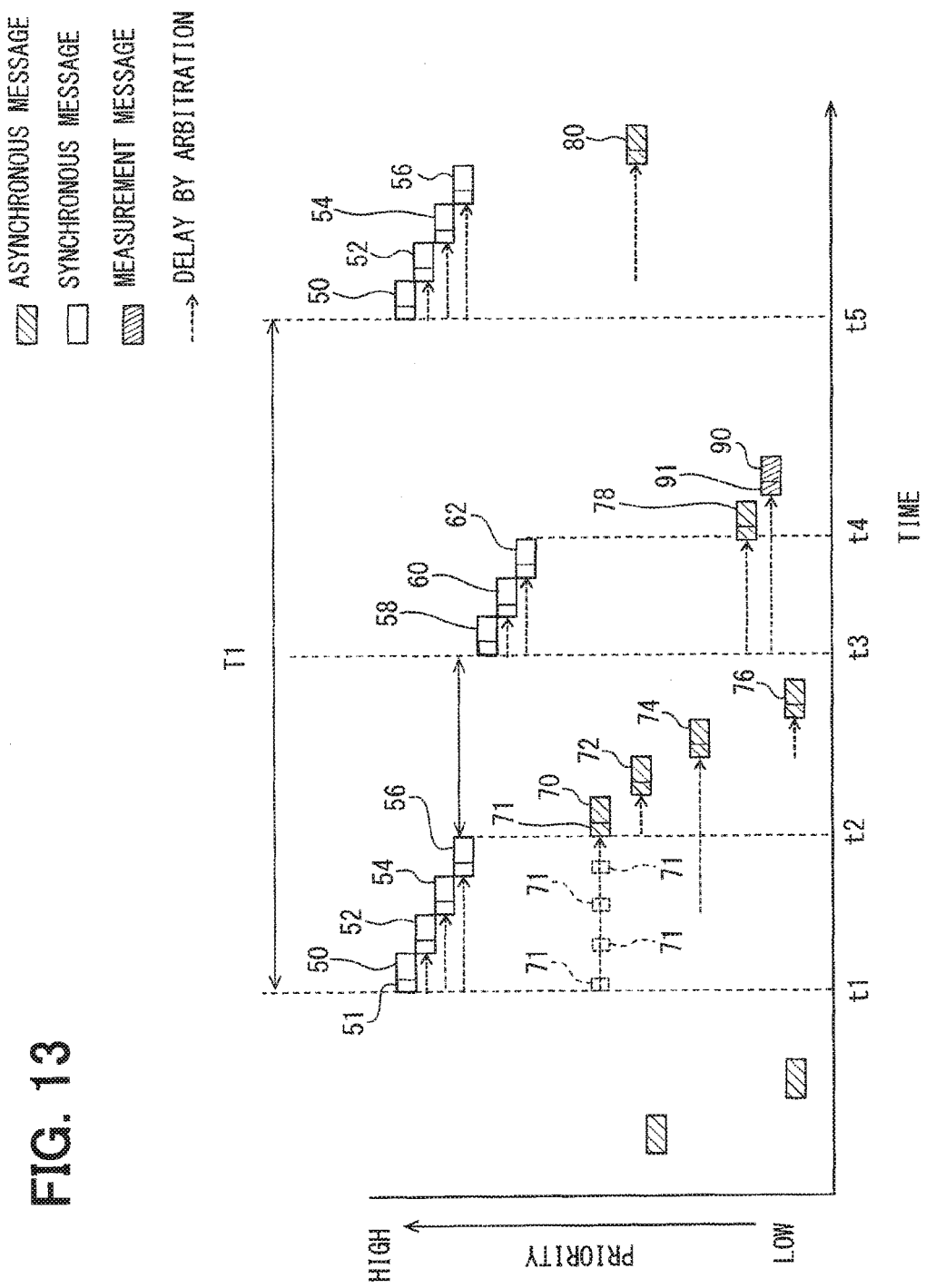
FIG. 13 is a diagram illustrating an example of message transmission when a communication through the second communication line.

Referring to FIG. 13, the communication through the first communication line 4 is normal during a period before time t1 and abnormal during a period after time t1. A synchronous message 50 is a reference message and includes an ID code 51. The ID code 51 has a trigger function. No sign is given to the ID codes of synchronous messages 52, 54, 56, 58, 60, 62 other than a reference message. Meanwhile, an asynchronous message 70 has an ID code 71. No sign is given to the ID codes of the other asynchronous messages 72, 74, 76, 78, 80. A measurement message 90 has an ID code 91. A synchronous message, an asynchronous message, and a measurement message may be hereinafter simply referred to as a message.

In the example of FIG. 13, the synchronous messages 50, 52, 54, 56, 58, 60, 62 are assigned a higher priority than the asynchronous messages 70, 72, 74, 76, 78, 80. The synchronous message 50 serving as a reference message is assigned the highest priority. The synchronous messages 52, 54, 56, 58, 60, 62 are assigned the second and subsequent highest priorities in the order named. The synchronous messages 52, 54, 56 each belong to the aforementioned synchronous message A, and the synchronous messages 58, 60, 62 each belong to the aforementioned synchronous message B. The synchronous messages 50, 52, 58, 60 are transmitted from the first ECU 10, and the synchronous messages 54, 56, 62 are transmitted from the first ECU 12. In FIG. 13, a delay caused by arbitration is indicated by a broken-one arrow. ID codes 71 lost in arbitration are indicated by broken lines.

If the messages 50, 52, 54, 56, 70 initiated at time t1 conflict, the synchronous message 50 having the highest-priority ID code 51, that is, the reference message is given a transmission right. Therefore, the synchronous message 50 is first transmitted. After the synchronous message 50 is transmitted, the second communication line 6 is released. Thus, at the end of standby time equivalent to a predetermined number of bits (3 bits), the synchronous messages 52, 54, and 56 are sequentially transmitted in the order named according to priority.

At time t2, the transmission of synchronous messages A is completed, the second communication line 6 is released, and the standby time equivalent to the predetermined number of bits terminates. At time t3, the transmission of synchronous messages B starts. Time t3 is set so that the elapsed time from time t1 is half the cycle T (e.g., 4 ms) of the reference message. During a period (i.e., interval t2-t3) between time t2 and time t3, no synchronous messages are transmitted. During this period, the asynchronous messages 70, 72, 74, 76 are transmitted. In this instance, the asynchronous messages 70, 72, 74, 76 are transmitted in the order named according to priority.

If the messages 58, 60, 62, 78, 90 initiated at time t3 conflict, the synchronous message 58 having the highest-priority is given a transmission right. Therefore, the synchronous message 58 is first transmitted. Subsequently, the synchronous messages 60 and 62 are sequentially transmitted in the order named according to priority. As the ID code 91 of the measurement message 90 is assigned lower priority than that of the asynchronous message 78, the asynchronous message 78 and the measurement message 90 are sequentially transmitted in the order named after the transmission of the synchronous messages B.

As described, even if the communication through the first communication line 4 is abnormal, the present embodiment can transmit the synchronous data through the second communication line 6. When the synchronous data is to be transmitted through the second communication line 6, all the synchronous messages to be transmitted are separately transmitted at a plurality of points of time during one cycle between the reception of a reference message (second reference signal) transmitted at a first time and the reception of a next reference message transmitted at a second time. That is, a period of time between the first time and the second time corresponds to one transmission cycle of a reference message. Then, the asynchronous messages are transmitted during a predetermined interval between the transmissions of the synchronous messages, that is, during an interval between time t2 and time t3, which are indicated in FIG. 13. Consequently, undue delay in the transmission of the asynchronous messages (asynchronous data) can be suppressed as compared to a case where all the synchronous messages (synchronous data items) are successively transmitted.

Particularly, a method in the embodiment for communicating the synchronous messages to the second communication line 6 is also compliant with the CAN protocol standardized by the ISO. This eliminates the necessity of developing a new controller or transceiver. Consequently, the communication system 2 can be built at a low cost.

The number of synchronous data transmitted to the second communication line 6 is smaller than the number of synchronous data transmitted to the first communication line 4. Thus, the number of synchronous messages (frames) can be reduced. Such a decrease in the number of data can effectively avoid undue delay in the transmission of asynchronous messages while using the second communication line 6 for the transmission of synchronous messages.

Furthermore, in the embodiment, one transmission cycle at which a reference message (second reference signal) is transmitted to the second communication line 6 is longer than one transmission cycle at which a reference message (first reference signal) is transmitted to the first communication line 1. This can effectively avoid undue delay in the transmission of asynchronous messages while using the second communication line 6 for the transmission of synchronous messages.

Moreover, in the embodiment, received synchronous data is used for synchronization control only when the last synchronous message, which is among all the synchronous messages to be received during a cycle T1, is determined to be received. Consequently, a reception process can be performed collectively without losing synchronism.

Particularly when it is determined that last synchronous data is not received, all the synchronous data are cancelled or discarded. Synchronism can be maintained.

Additionally, the load on the second communication line 6 can be detected depending on whether a period of time (i.e., measurement period of time or time interval) between the transmission of the measurement message to the second communication line 6 and the reception of the same message is not shorter than a predetermined reference period of time, that is, half the cycle T1 (half cycle) indicated, for instance, in FIG. 13.

If a high load is imposed on the second communication line 6, the number of synchronous data to be transmitted to the second communication line 6 can be made smaller than a normal value. Thus, the number of synchronous messages (frames) can be reduced. In this manner, the number of data can be reduced to continuously exercise synchronization control while adjusting the load imposed on the second communication line 6. The number of synchronous data can be reduced by adjusting travel information, for example, by lowering an evacuating travel level from a vehicle speed of 40 km/h to a vehicle speed of 20 km/h.

Besides, according to the embodiment, the reference message is assigned a higher priority than all the asynchronous messages. Further, the synchronous messages are assigned a higher priority than all the asynchronous messages. Therefore, the synchronous messages can be surely transmitted during the cycle T1 of the reference message. The loss of the synchronous messages can be avoided.

The disclosure described in this document is not limited to the exemplified embodiment. The disclosure includes not only the exemplified embodiment, but also modified embodiments that are based on the exemplified embodiment and contemplated by those skilled in the art. For example, the disclosure is not limited to a combination of elements described in conjunction with the embodiment. The disclosure may be implemented based on various combinations of the elements. Disclosed technical scopes are not limited to those defined by the embodiment.

The number of first ECUs is not limited to the above example. Three or more first ECUs may be used. The number of second ECUs is not limited to the above example, either. At least one second ECU should be used.

The method of communication through the first communication line 4 is not limited to CAN. An alternative communication method may be used as far as the synchronous messages are transmitted in response to the first reference signal and a plurality of data are shared by a plurality of first ECUs. For example, a synchronous serial communication method or a time trigger method such as TTCAN and FlexRay (registered trademark) may be used. When the synchronous serial communication method is used, a clock signal corresponds to the first reference signal. When FlexRay is used, a periodically transmitted period start signal corresponds to the first reference signal.

In the foregoing example, it is assumed that the reference message is assigned a higher priority than all the asynchronous messages. However, the reference message should be assigned a higher priority than at least one asynchronous message. Further, it is assumed that the synchronous messages are assigned a higher priority than all the asynchronous messages. However, the synchronous messages should be assigned a higher priority than at least one asynchronous message. To control a vehicle, urgent asynchronous data may be assigned the highest priority while the synchronous messages including the reference message are assigned a lower priority.

In the foregoing example, it is assumed that a plurality of synchronous messages are transmitted at two different points of time based on the order of reference message transmission. For instance, in FIG. 13, the synchronous messages A including the reference message, as group A, are successively transmitted from time t1 as the first point of time; subsequently to an interval t2-t3, the synchronous messages B, as group B, are then successively transmitted from time t3 as the second point of time. This configuration can provide at least one interval t2-t3 at which at least one asynchronous data or data item is permitted to be transmitted during one cycle T1 of reference message transmission. However, the synchronous messages may be transmitted at three or more different points of time.

In the foregoing example, it is assumed that a synchronous message of the first ECU 10 acting as a master node is given priority no matter whether the synchronous message is synchronous message A or B. However, the order of transmission is not limited to the foregoing example. For example, the synchronous message of the first ECU 12 may be given priority except for the reference message. Further, the synchronous message of the first ECU 10 may be handled as synchronous message A while the synchronous message of the first ECU 12 is handled as synchronous message B.

In addition to the ECUs 8, an ECU that performs only a reception operation and does not perform a transmission operation relative to the second communication line 6 may be used as an ECU to be connected to the second communication line 6.

Figure 14:
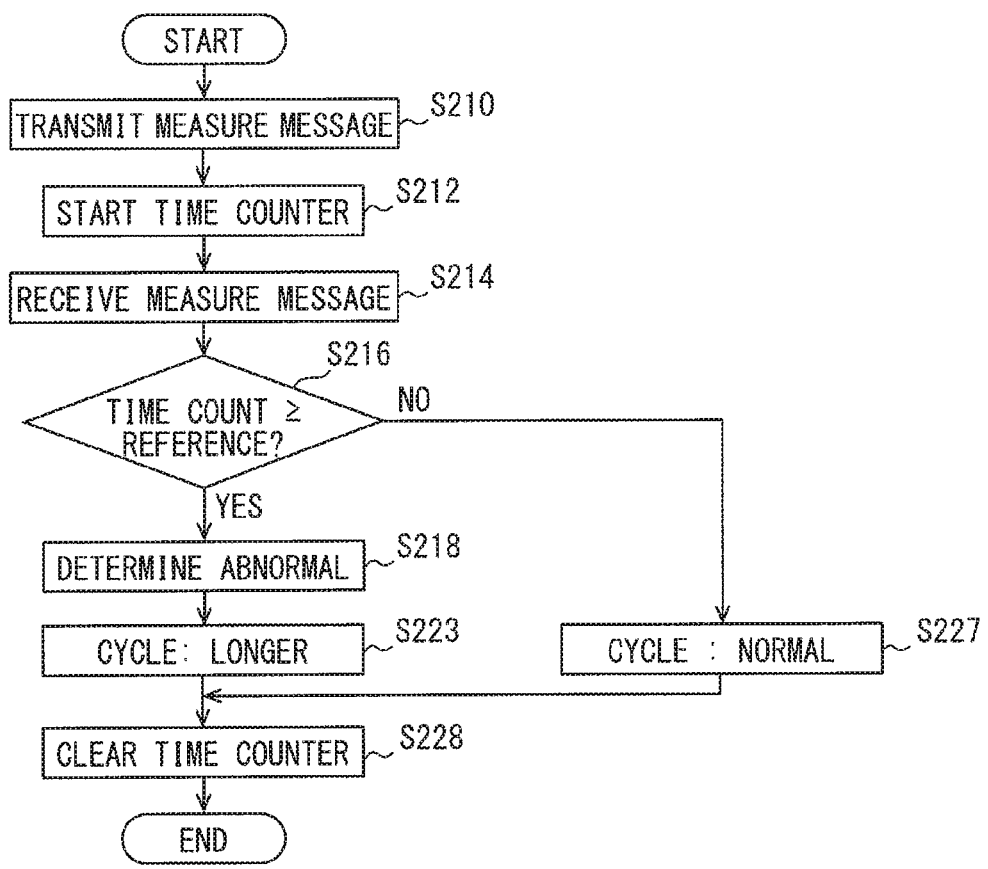
FIG. 14 is a flowchart illustrating a first modification of the process in FIG. 12.

FIG. 14 illustrates a first modification of the process in FIG. 12. When a high load is imposed on the second communication line 6, the transmission cycle of the reference message serving as the second reference signal may be longer than a normal value. FIG. 14 is substantially the same as FIG. 12. FIG. 14 differs from FIG. 12 in that S223 and S227 are performed in place of S220, S222, S224, and S226. If it is determined in S218 that an abnormality exists because a high load is imposed on the second communication line 6, the transmission cycle of the reference message is set in S223 to be longer than the normal value. Meanwhile, if the result of determination in S216 indicates that the time count is smaller than the reference period of time, the transmission cycle of the reference message is to set in S227 to the normal value. This increases the cycle T1 of transmission indicated in FIG. 13 when a high load is imposed on the second communication line 6. Consequently, synchronization control can be continuously exercised while adjusting the load imposed on the second communication line 6. Further, an increased number of asynchronous messages can be transmitted between the transmissions of synchronous messages. S223 corresponds to a cycle setting section or a cycle setter. The process in FIG. 14 may be combined with the process in FIG. 12.

In the foregoing example, it is assumed that part of the synchronous data transmitted to the first communication line 4 is transmitted to the second communication line 6. Alternatively, however, all the synchronous data transmitted to the first communication line 4 may be transmitted to the second communication line 6.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A communication system comprising:
a first communication line;
a second communication line;
a plurality of first ECUs (electronic control units) connected through the first communication line; and
at least one second ECU (electronic control unit) that is connected through the second communication line together with the plurality of first ECUs;
one of the plurality of first ECUs acting as a master node, including
  a first reference signal transmitter that periodically transmits a first reference signal to the first communication line to perform time adjustment,
  an abnormality detector that detects an abnormality in communication established through the first communication line, and
  a second reference signal transmitter that periodically transmits a second reference signal to the second communication line to perform time adjustment when an abnormality is detected by the abnormality detector,
the plurality of first ECUs each including
  a first synchronous data transmitter that transmits at least one first synchronous data item to the first communication line upon receiving the first reference signal, and
  a second synchronous data transmitter that transmits at least one second synchronous data item to the second communication line upon receiving the second reference signal,
the plurality of first ECUs and the at least one second ECU each including
  a priority transmitter that transmits priority information associated with each of asynchronous data items to the second communication line,
  a priority determiner that determines which of (i) priority information that is transmitted locally and (ii) priority information that is transmitted from elsewhere to the second communication line, has a higher priority, and
  an asynchronous data transmitter that transmits, when the priority information transmitted locally has the higher priority, an asynchronous data item associated with the priority information transmitted locally, subsequently to the priority information transmitted locally, wherein:

the second reference signal has a higher priority than a subject asynchronous data item that is at least one of the asynchronous data items, while the second synchronous data item has a higher priority than the subject asynchronous data item;

the second reference signal transmitter of the plurality of first ECUs acting as the master node transmits the second reference signal at a first time and the second reference signal at a second time subsequent to the first time, a transmission cycle of the second reference signal being defined as a predetermined period of time between the first time and the second time; and in cases that the second synchronous data transmitter of each of the plurality of first ECUs performs a transmission of the second synchronous data item during the transmission cycle, upon receiving the second reference signal at the first time, transmissions of entire second synchronous data items needed to be transmitted from the plurality of first ECUs during the transmission cycle of the second reference signal are performed at mutually different points of time such that the subject asynchronous data item is permitted to be transmitted during an interval between the transmissions of the entire second synchronous data items.

2. The communication system according to claim 1, wherein a number of the second synchronous data items transmitted by the second synchronous data transmitter is smaller than the number of first synchronous data items transmitted by the first synchronous data transmitter.

3. The communication system according to claim 1, wherein the transmission cycle of the second reference signal transmitted by the second reference signal transmitter is longer than a transmission cycle of the first reference signal transmitted by the first reference signal transmitter.

4. The communication system according to claim 1, wherein:

the plurality of first ECUs each include a reception completion determiner that determines whether a last-transmitted second synchronous data item that is among the second synchronous data items to be received within the predetermined period of time is received; and when the last-transmitted second synchronous data item is determined to be received, the received second synchronous data items are used as control information to control synchronization.

5. The communication system according to claim 4, wherein the plurality of first ECUs include a data canceller that cancels all the second synchronous data items when the last-transmitted second synchronous data item is determined to be not received.

6. The communication system according to claim 1, wherein the master node includes a measured data transmitter that performs transmission to the second communication line of a measured data item having a lower priority than the subject asynchronous data item, and a load detector that detects whether a measurement period of time between the transmission of the measured data item and a reception of the measured data item is not shorter than a reference period of time.

7. The communication system according to claim 6, wherein the master node includes a data count setter that, when the measurement period of time between the transmission of the measured data item and the reception of the measured data item is determined to be not shorter than the reference period of time, sets a number of the second synchronous data items to be transmitted by the second synchronous data transmitter to a smaller value than when the measurement period of time between the transmission of the measured data item and the reception of the measured data item is determined to be shorter than the reference period of time.

8. The communication system according to claim 6, wherein the master node includes a cycle setter that, when the measurement period of time between the transmission of the measured data item and the reception of the measured data item is determined to be not shorter than the reference period of time, sets the transmission cycle of the second reference signal to a greater value than when the measurement period of time between the transmission of the measured data item and the reception of the measured data item is determined to be shorter than the reference period of time.

9. The communication system according to claim 1, wherein the second reference signal has a higher priority than all the asynchronous data items.

10. The communication system according to claim 1, wherein the second synchronous data items each have a higher priority than all the asynchronous data items.

* * * * *